United States Patent [19]

Wolstein et al.

[11] 4,347,228

[45] Aug. 31, 1982

[54] PROCESS FOR DEFLUORINATION OF PHOSPHORIC ACID

[75] Inventors: Friedrich Wolstein, Essen; Gerhard Koch, Marklohe, both of Fed. Rep. of Germany

[73] Assignees: Uhde GmbH; Kali Chemie AG, both of Dortmund, Fed. Rep. of Germany

[21] Appl. No.: 236,657

[22] Filed: Feb. 23, 1981

[30] Foreign Application Priority Data

Mar. 13, 1980 [DE] Fed. Rep. of Germany ....... 3009622

[51] Int. Cl.³ .............................................. C01B 25/16
[52] U.S. Cl. ............................................... 423/321 R
[58] Field of Search ........................... 423/320, 321 R

[56] References Cited

U.S. PATENT DOCUMENTS

| | | | |
|---|---|---|---|
| 2,123,785 | 7/1938 | Knox et al. | 423/321 R |
| 2,132,349 | 10/1938 | Booth | 423/321 R |
| 2,987,376 | 6/1961 | Gloss | 423/321 R |
| 3,151,941 | 10/1964 | Hollingsworth et al. | 423/321 R |
| 3,193,351 | 7/1965 | Miller et al. | 423/321 R |

Primary Examiner—O. R. Vertiz
Assistant Examiner—Gregory A. Heller
Attorney, Agent, or Firm—Wilson, Fraser, Barker & Clemens

[57] ABSTRACT

The invention relates to a process for the defluorination of phosphoric acid by the addition of active porous silica gel.

3 Claims, No Drawings

PROCESS FOR DEFLUORINATION OF PHOSPHORIC ACID

BACKGROUND OF THE INVENTION

For many industrial applications of the phosphoric acid, for instance in the fodder and detergent industries, it is necessary to maintain the fluorine content of the phosphoric acid as low as possible. Moreover, a low fluorine content is required to prevent corrosion of components that are in contact with the phosphoric acid.

Several processes are known for reducing the fluorine content of the phosphoric acid. DE-AS 11 48 531, for example, describes a process in which hot combustion gases and water vapor are simultaneously added to a solution containing at least 48% $P_2O_5$. A similar process is described in U.S. Pat. No. 2,977,196.

Another process is disclosed in DD-PS No. 30 306 in which prior to concentrating the phosphoric acid by heating, finely-distributed silicic acid is added to convert most of the fluorine to silicon tetrafluoride, which is separated in the boiling phase of the phosphoric acid.

Processes are also known in which $SiO_2$ is added in the form of infusorial earth, water glass, diatomaceous earth, etc. prior to concentrating the phosphoric acid, thereby effecting a precipitation of the alkaline silicofluorides contained in the phosphoric acid and/or the formation of volatile silicofluoride (U.S. Pat. No. 3,193,351).

In another known process alkaline or alkaline earth compounds are added to the diluted and/or concentrated phosphoric acid, if necessary in conjunction with the addition of $SiO_2$, thus achieving a precipitation of the resulting alkaline or alkaline earth silicofluorides.

When adding water glass, the reaction of the fluorides in the phosphoric acid or the hydrofluoric acid is such that silicofluorides are formed which precipitate with the alkali of the water glass and/or escape as gaseous $SiF_4$ or $H_2SiF_6$. This reaction produces an equilibrium of about 0.4% F. in a phosphoric acid with a $P_2O_5$ concentration of 54%.

It is also known that phosphate rock has a certain $SiO_2$ content. When the phosphate rock is digested by sulphuric acid, part of the Si compounds are dissolved in the phosphoric acid. When concentrating phosphoric acid which was obtained from phosphate rock containing $SiO_2$, it is also possible to reduce the fluoride content by precipitating the alkaline or alkaline earth silicofluorides or by volatilizing the $H_2SiF_6$ or $SiF_4+H_2F_2$.

The known processes generally have a high energy and equipment demand and are not sufficient to obtain the low fluorine content required.

SUMMARY OF THE INVENTION

The aim of the invention is to reduce by simple means the fluorine content of the phosphoric acid to less than 0.1% at the end of the concentration stage.

DESCRIPTION OF THE PREFERRED EMBODIMENT

It was surprising to find that the reduction of the fluorine content of the phosphoric acid is a catalytic reaction.

A catalyst is a substance that changes the velocity of a reaction without interfering with the thermodynamic balance.

The catalytic action of a catalyst is due to the so-called active centers. So, if the reduction of the fluorine content is a catalytic reaction, it must be possible to control this reaction by decreasing the number of active centers which is a function of the catalyst structure. The essential features of the catalyst structure are the specific size, the pore volume and the mean pore diameter.

Using a process of the type described at the beginning, the aim is achieved with the aid of silica gel having a pore volume of 0.3 to 1.5 ml/g.

A further embodiment of the invention relates to a process of the type described at the beginning where a silica gel has a specific surface of 130 to 600 $m^2/g$ is used.

It is already known how to reduce the fluorine content by the addition of solid $SiO_2$ in the form of a natural product (diatomaceous earth) or of commercial active silica gel, but when using solid $SiO_2$ which is almost non-porous, the resulting fluorine content is still as high as about 0.2%.

According to this invention, however, the fluorine content of the product phosphoric acid can be reduced to a value less than 0.1%.

In an earlier parallel application it was suggested that silica gel with a mean pore diameter of 50 Å to 1000 Å be used. The aim of said application is in fact achieved with the aid of such silica gel, but the formation of the silica gel is easier to control via the pore volume and Na content, which are decisive for the specific surface, particularly because the pore volume and the surface may vary in spite of a constant pore diameter.

A further embodiment of the invention provides for the use of silica gel which has a pore volume of 0.3 to 1.5 ml/g and a Na content of 0.05 to 1.0% by weight. A modified method of the inventive process uses silica gel with a specific surface of 130 to 600 $m^2/g$ and a Na content of 0.05 to 0.7% by weight.

The invention also provides for the use of silica gel with a maximum $Al_2O_3$ content of 0.5% by weight. A prerequisite for this method, however, is that the active silica gel has a maximum $Al_2O_3$ content of 0.5%.

A test was performed according to the inventive process, adding 2% by weight of active silica gel referred to the phosphoric acid with 30% $P_2O_5$ and a fluorine content of 1.6%. The phosphoric acid was then concentrated to a $P_2O_5$ content of 54% by weight.

After concentrating the solids-free phosphoric acid the fluorine content was determined and the attached table shows the results obtained when using the inventive process.

TABLE

| Type | $SiO_2$ % | $Al_2O_3$ % | Na % | Specific surface $m^2g$ | Pore volume ml/g | Mean pore diameter nm | Fluoride content of phosphoric acid (54% $P_2O_5$) in % |
|---|---|---|---|---|---|---|---|
| W 608 | 92.0 | 8,0 | 0,1 | 485 | 0,64 | 5,3 | 0,19 |
| BR 1424 | 99,8 | 0,1 | 0,34 | 32 | 0,83 | 104 | 0,35 |
| M 126 | 99,8 | 0,1 | 0,16 | 315 | 0,96 | 12,0 | 0,08 |

TABLE -continued

| Type | SiO$_2$ % | Al$_2$O$_3$ % | Na % | Specific surface m$^2$g | Pore volume ml/g | Mean pore diameter nm | Fluoride content of phosphoric acid (54% P$_2$O$_5$) in % |
|---|---|---|---|---|---|---|---|
| M 22 D | 98,0 | 0,2 | 0,7 | 180 | 1,0 | 2,2 | 0,09 |

We claim:

1. In a process for the defluorination of phosphoric acid by a method which includes a heating step conducted in the presence of an additive present in the acid, and comprising silica, to accomplish both concentration and removal of fluorine, the improvement wherein the additive consists essentially of active porous silica gel having a specific surface of 130 to 600 m$^2$/g and having a mean pore volume of 0.3 to 1.5 m 1/g.

2. In a process as claimed in claim 1, the improvement wherein said silica gel additionally has a sodium content of 0.05 to 1.0% by weight.

3. In a process as claimed in claim 1, the improvement wherein said silica gel additionally has a maximum Al$_2$O$_3$ content of 0.5% by weight.

* * * * *